United States Patent
Boonen et al.

(10) Patent No.: US 9,949,325 B2
(45) Date of Patent: Apr. 17, 2018

(54) BLEEDER FOR IMPROVING DIMMING OF LED

(71) Applicant: PHILIPS LIGHTING HOLDING B.V., Eindhoven (NL)

(72) Inventors: Paul Theorodus Jacobus Boonen, Eindhoven (NL); Bertrand Johan Edward Hontele, Eindhoven (NL)

(73) Assignee: PHILIPS LIGHTING HOLDING B.V., Eindhove (NL)

( * ) Notice: Subject to any disclaimer, the term of this patent is extended or adjusted under 35 U.S.C. 154(b) by 0 days.

(21) Appl. No.: 15/038,586

(22) PCT Filed: Dec. 5, 2014

(86) PCT No.: PCT/EP2014/076660
§ 371 (c)(1),
(2) Date: May 23, 2016

(87) PCT Pub. No.: WO2015/082661
PCT Pub. Date: Jun. 11, 2015

(65) Prior Publication Data
US 2016/0302272 A1    Oct. 13, 2016

(30) Foreign Application Priority Data
Dec. 5, 2013   (EP) .................... 13195842

(51) Int. Cl.
H05B 33/08    (2006.01)
(52) U.S. Cl.
CPC ..... *H05B 33/0815* (2013.01); *H05B 33/0824* (2013.01); *H05B 33/0851* (2013.01)
(58) Field of Classification Search
CPC ............ H05B 33/0803; H05B 33/0809; H05B 33/0812; H05B 33/0815; H05B 33/0818;
(Continued)

(56) References Cited

U.S. PATENT DOCUMENTS

2010/0090604 A1   4/2010  Maruyama et al.
2011/0121760 A1   5/2011  Davis et al.
(Continued)

FOREIGN PATENT DOCUMENTS

WO   WO2010150158 A1   12/2010
WO   WO2012168844 A2   12/2012
WO   WO2013011924 A1    1/2013

OTHER PUBLICATIONS

Fairchild Semiconductor Corporation, "AN-9745 Design Guide for TRIAC Dimmable LED Driver Using FL7730", www.fairchildsemi.com, Rev. 1.0.2; Oct. 11, 2012, 11 pages total.
(Continued)

*Primary Examiner* — Alexander H Taningco
*Assistant Examiner* — Seokjin Kim
(74) *Attorney, Agent, or Firm* — Akarsh P. Belagodu (57) ABSTRACT

Bleeder circuits (1) comprise detection circuits (11) for detecting values of amplitudes of feeding currents for feeding light emitting diode circuits (2) and comprise introduction circuits (12) for introducing bleeder currents. Values of amplitudes of bleeder currents are defined in response to detection results from the detection circuits (11). As a result, disadvantageous connections between the bleeder circuits (1) and dimmers (4) are avoided, and the bleeder circuits (1) can be located near the light emitting diode circuits (2) and they can use the same heat sink. The detection circuit (11) may comprise a first resistor circuit (31), and the introduction circuit (12) may comprise a first transistor circuit (41). The detection circuit (11) may further comprise a second resistor circuit (32) for coupling the first transistor circuit (41) to the first resistor circuit (31) and may comprise an operational amplifier (51) or a second transistor circuit (42) for controlling the first transistor circuit (41).

11 Claims, 4 Drawing Sheets

(58) Field of Classification Search
CPC ............ H05B 33/0824; H05B 33/0845; H05B 33/0851; H05B 33/0887; H05B 37/0209
See application file for complete search history.

(56) References Cited

U.S. PATENT DOCUMENTS

| | | |
|---|---|---|
| 2012/0268040 A1 | 10/2012 | Riesebosch |
| 2012/0319621 A1* | 12/2012 | Sutardja ............. H05B 33/0815 315/307 |
| 2013/0187564 A1 | 7/2013 | Brandt |
| 2014/0239849 A1* | 8/2014 | Del Carmen, Jr. H05B 33/0815 315/307 |

OTHER PUBLICATIONS

Watt, "IW3614 AC/DC Digital Power Controller for High Power Factor Dimmable LED Drivers", https://www.iwatt.com, Rev. 0.7, 2013, 18 pages total.

Watt, "Adaptive Chopping Circuit for Retrofit Dimmable LED Driver", iWatt Inc., Los Gatos CA 95032, APEC 2011, 38 pages total.

* cited by examiner

BLEEDER FOR IMPROVING DIMMING OF LED

CROSS-REFERENCE TO PRIOR APPLICATIONS

This application is the U.S. National Phase application under 35 U.S.C. § 371 of International Application No. PCT/EP2014/076660, filed on Dec. 5, 2014, which claims the benefit of European Patent Application No. 13195842.3, filed on Dec. 5, 2013. These applications are hereby incorporated by reference herein.

FIELD OF THE INVENTION

The invention relates to a bleeder circuit for improving a dimming operation of a light emitting diode circuit. The invention further relates to a device comprising the bleeder circuit. Examples of such a device are lamps or luminaires comprising one or more light emitting diodes.

BACKGROUND OF THE INVENTION

US 2012/0268040 A1 discloses (§0032, §0035) a bleeder circuit which monitors and tracks edges of a power envelope of power entering or leaving a dimmer.

US 2010/0090604 A1 discloses a circuit that detects and by-passes leakage current in the off state of a dimmer. Current is detected by a detection circuit at the connection between the dimmer and a current limiter of a LED drive circuit. An active element connected between the current limiter and the LEDs, in parallel to the LEDs, and controlled by the detection circuit may by-pass the leakage current from the dimmer. This configuration is complicated because it requires several additional connections for the detection circuit and for the active element.

WO2013/011924 A1 discloses a bypass circuit provided with a detection unit. The detection unit monitors the current received from a dimmer. When the current detected by the detection unit exceeds a prescribed value, the current through the bypass circuit is interrupted. This configuration requires connections with the dimmer.

SUMMARY OF THE INVENTION

It is an object of the invention to provide an improved bleeder circuit. It is a further object of the invention to provide a device.

According to a first aspect, a bleeder circuit is provided for improving a dimming operation of a light emitting diode circuit, the bleeder circuit comprising
a detection circuit for detecting a value of an amplitude of a current, and
an introduction circuit for introducing a bleeder current, a value of an amplitude of the bleeder current being defined in response to a detection result from the detection circuit,
wherein the detection circuit is configured to detect a feeding current provided by a converter and which feeding current is configured to flow through at least a part of the light emitting diode circuit.

A bleeder circuit for improving a dimming operation of a light emitting diode circuit is provided with a detection circuit for detecting a value of an amplitude of a feeding current configured to flow through (at least a part of) the light emitting diode circuit. This feeding current is configured to feed (at least the part of) the light emitting diode circuit. The bleeder circuit is further provided with an introduction circuit for introducing the bleeder current. The detection circuit informs and/or controls the introduction circuit such that a value of an amplitude of the bleeder current is defined in response to a detection result from the detection circuit. In other words, a value of an amplitude of a feeding current configured to flow through (at least a part of) the light emitting diode circuit is used to derive a value of an amplitude of a bleeder current. Usually, the bleeder current does not flow through the light emitting diode circuit, contrary to the feeding current which flows through (at least a part of) the light emitting diode circuit for feeding purposes. As a result, a bleeder circuit can be located near a light emitting diode circuit, without any (additional) connections needing to be made between the bleeder circuit and a dimmer and/or between the bleeder circuit and a converter. The bleeder circuit uses only the value of the amplitude of the feeding current for defining the value of the amplitude of the bleeder current. Such a bleeder circuit can for example be integrated together with the light emitting diode circuit, and the bleeder circuit and the light emitting diode circuit can for example use the same heat sink. These are great advantages.

A light emitting diode circuit comprises one or more light emitting diodes of whatever kind and in whatever combination. Usually, for smaller values of the amplitude of the feeding current, the amplitude of the bleeder current will have non-zero values, and for larger values of the amplitude of the feeding current, the amplitude of the bleeder current will have a zero value. A feeding current flows through only a part of the light emitting diode circuit in case the other part has been deactivated or in case the other part is fed otherwise.

An embodiment of the bleeder circuit is defined by a relatively large value of the amplitude of the feeding current resulting in a relatively small value of the amplitude of the bleeder current, and a relatively small value of the amplitude of the feeding current resulting in a relatively large value of the amplitude of the bleeder current. For relatively large values of the amplitude of the feeding current, such as from 50 mA to 100 mA, the amplitude of the bleeder current may for example have a zero value. For relatively small values of the amplitude of the feeding current, such as from 0 mA to 20 mA and from 20 mA to 50 mA respectively, the amplitude of the bleeder current may for example go up from 0 mA to 10 mA and go down from 10 mA to 0 mA respectively, linearly and/or non-linearly. Other values are not to be excluded.

An embodiment of the bleeder circuit is defined by the detection circuit comprising a first resistor circuit, and the introduction circuit comprising a first transistor circuit. This embodiment of the bleeder circuit can together with the light emitting diode circuit be easily integrated.

An embodiment of the bleeder circuit is defined by the first transistor circuit comprising a single transistor or comprising two transistors in a Darlington configuration. A first transistor circuit in the form of one transistor is a simple and low cost and robust embodiment. A first transistor circuit in the form of two transistors in a Darlington configuration offers more amplification.

An embodiment of the bleeder circuit is defined by the detection circuit further comprising a second resistor circuit for coupling the first transistor circuit to the first resistor circuit, the second resistor circuit being coupled to a first main electrode of the first transistor circuit. A second resistor circuit in the detection circuit couples the first resistor circuit to a first main electrode of the first transistor circuit, indirectly via a further circuit, or directly without a further circuit being in between.

An embodiment of the bleeder circuit is defined by the detection circuit further comprising an operational amplifier for controlling the first transistor circuit. An operational amplifier may have an internal reference source or may use an external reference source.

An embodiment of the bleeder circuit is defined by the detection circuit further comprising a second transistor circuit for controlling the first transistor circuit. A second transistor circuit may comprise one or more transistors.

An embodiment of the bleeder circuit is defined by the second transistor circuit comprising a single transistor. A second transistor circuit in the form of one transistor is a simple and low cost and robust embodiment.

An embodiment of the bleeder circuit is defined by the second transistor circuit comprising two transistors in a differential amplifier configuration and two transistors in a current mirror configuration. A second transistor circuit comprising a differential amplifier configuration as well as a current mirror configuration will compared to the one transistor embodiment perform better.

An embodiment of the bleeder circuit is defined by the detection circuit further comprising a second transistor circuit for controlling the first transistor circuit, the second resistor circuit being coupled to a first main electrode of the first transistor circuit via electrodes of the second transistor circuit. A second resistor circuit in the detection circuit couples the first resistor circuit to a first main electrode of the first transistor circuit indirectly via a further circuit in the form of a second transistor circuit.

An embodiment of the bleeder circuit is defined by the second transistor circuit comprising two transistors in a current mirror configuration. A second transistor circuit comprising a current mirror configuration will offer good thermal stability.

An embodiment of the bleeder circuit is defined by further comprising a bypassing circuit for bypassing at least a part of the detection circuit during an inactivity of the bleeder circuit. When bypassing at least a part of the detection circuit during an inactivity of the bleeder circuit, a power consumption is reduced.

An embodiment of the bleeder circuit is defined by the bypassing circuit comprising a diode circuit coupled in parallel to a first resistor circuit of the detection circuit. A bypassing circuit in the form of a diode circuit for example comprising one or more diodes is a simple and low cost and robust embodiment.

According to a second aspect, a device is provided comprising the bleeder circuit as defined above and further comprising a light emitting diode circuit, the bleeder circuit and the light emitting diode circuit being thermally coupled. Preferably, the bleeder circuit and the light emitting diode circuit are thermally coupled. When one of them is dissipating relatively much power, usually the other one will dissipate relatively little power.

An embodiment of the device is defined by further comprising a converter for providing the bleeder current and the feeding current, the converter on the one hand and the bleeder circuit and the light emitting diode circuit on the other hand being thermally decoupled. Preferably, the converter on the one hand and the bleeder circuit and the light emitting diode circuit on the other hand should be thermally decoupled to fully separate both units thermally.

An insight is that a bleeder circuit should preferably be located near a light emitting diode circuit. A basic idea is that a value of an amplitude of a bleeder current is to be defined in response to a detection of a value of an amplitude of a feeding current configured to flow through at least a part of the light emitting diode circuit, to avoid (additional) connections between the bleeder circuit and a dimmer and/or between the bleeder circuit and a converter.

A problem to provide an improved bleeder circuit has been solved. Further advantages are that the bleeder circuit can be integrated together with the light emitting diode circuit and that the bleeder circuit and the light emitting diode circuit can use the same heat sink.

These and other aspects of the invention will be apparent from and elucidated with reference to the embodiments described hereinafter.

DETAILED DESCRIPTION OF EMBODIMENTS

Figure 1:
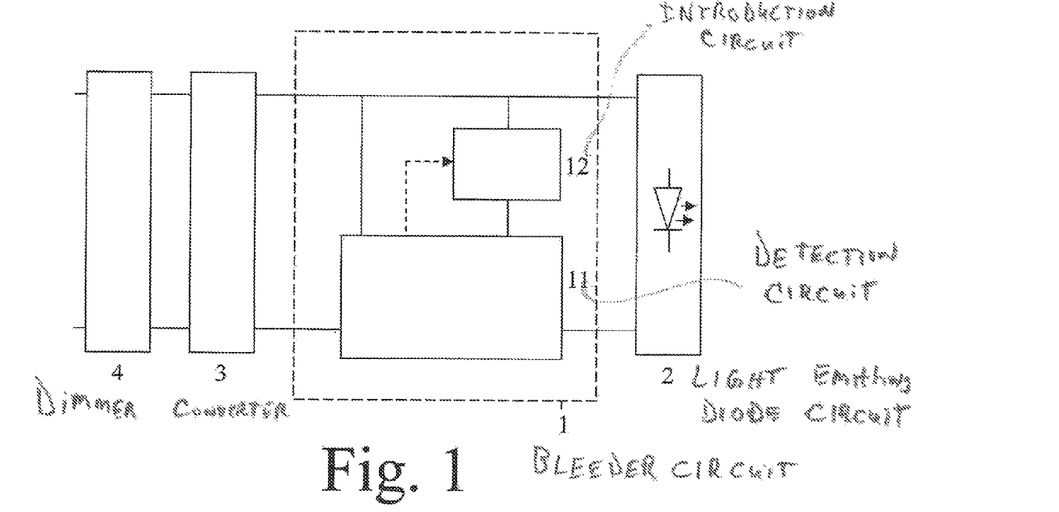
FIG. 1 shows an overview.

In the FIG. 1, an overview is shown. A bleeder circuit 1 for improving a dimming operation of a light emitting diode circuit 2 comprises a detection circuit 11 for detecting a value of an amplitude of a feeding current configured to flow through at least a part of the light emitting diode circuit 2 and comprises an introduction circuit 12 for introducing a bleeder current. A value of an amplitude of the bleeder current is defined in response to a detection result from the detection circuit 11. Input terminals of the bleeder circuit 1 are coupled to output terminals of a converter 3, such as for example a switch mode power supply, without having excluded other kinds of converters. Input terminals of the converter 3 are coupled to output terminals of a (phase-cut) dimmer 4, such as for example a classical triac dimmer, without having excluded other kinds of dimmers. Input terminals of the dimmer 4 are coupled to mains.

Preferably, a relatively large value of the amplitude of the feeding current will result in a relatively small value of the amplitude of the bleeder current, and a relatively small value of the amplitude of the feeding current will result in a relatively large value of the amplitude of the bleeder current. When the light emitting diode circuit 2 is dissipating relatively much power, usually the bleeder circuit 1 will dissipate relatively little power, and vice versa.

Figure 2:
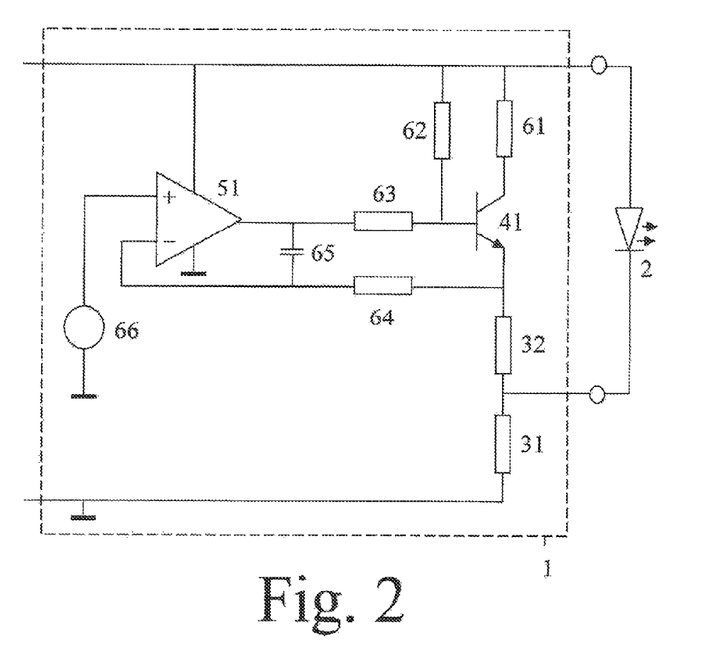
FIG. 2 shows a first embodiment of a bleeder circuit.

In the FIG. 2, a first embodiment of a bleeder circuit 1 is shown. A first input terminal of the bleeder circuit 1 is coupled to a first output terminal of the bleeder circuit 1. A second input terminal of the bleeder circuit 1 is coupled to a second output terminal of the bleeder circuit 1 via a first resistor circuit 31 here in the form of a single resistor, but an embodiment with more than one resistor is not to be excluded. The bleeder circuit 1 comprises a first transistor circuit 41, here in the form of a single transistor, but an embodiment with two or more transistors for example in a Darlington configuration is not to be excluded. A first main electrode of the first transistor circuit 41 is coupled via a second resistor circuit 32 to the first resistor circuit 31 and to the second output terminal of the bleeder circuit 1. The second resistor circuit 32 here comprises a single resistor, but an embodiment with more than one resistor is not to be excluded. A second main electrode of the first transistor circuit 41 is coupled via a resistor 61 to the first output terminal of the bleeder circuit 1. The resistor 61 reduces a power dissipation in the first transistor circuit 41, but can be left out without affecting a basic operation of the bleeder circuit 1. A control electrode of the first transistor circuit 41 is coupled via a resistor 62 to the first output terminal of the bleeder circuit 1 and via a resistor 63 to an output of an operational amplifier 51. The resistor 62 allows a control electrode current to be delivered to the control electrode of the first transistor circuit 41. The first main electrode of the first transistor circuit 41 is coupled via a resistor 64 to an inverting input of the operational amplifier 51. A non-inverting input of the operational amplifier 51 is coupled via an external reference source 66 to ground, with the second input terminal of the bleeder circuit 1 being coupled to ground too. Alternatively an operational amplifier with an internal (in-built) reference source may be used. The output of the operational amplifier 51 is coupled via a capacitor 65 to the inverting input of the operational amplifier 51.

As soon as an amplitude of a feeding current flowing through the light emitting diode circuit 2 coupled to the output terminals of the bleeder circuit 1 gets a too small value, an amplitude of a voltage across the resistor circuit 31 gets a too small value, and the operational amplifier 51 controls the first transistor circuit 41 to introduce a bleeder current. As a result, even for relatively small output intensities of the light emitting diode circuit 2, the dimmer 4 will not get into trouble. Usually, the first resistor circuit 31 and the second resistor circuit 32 and the operational amplifier 51 form part of the detection circuit 11, and the first transistor circuit 41 forms part of the introduction circuit 12.

Figure 3:
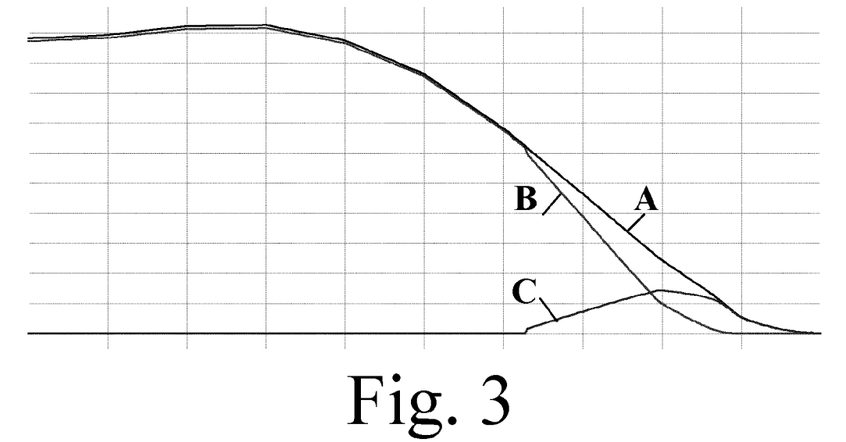
FIG. 3 shows waveforms for the first embodiment.

In the FIG. 3, waveforms for the first embodiment shown in the FIG. 2 are shown, vertical axis power (0 Watt to 8 Watt) or current (0 mA to 500 mA), horizontal axis conduction angle of the dimmer (180° to 0°). The waveform A shows the power transferred via the converter 3 (or the current flowing through the converter 3), the waveform B shows the power dissipated in the light emitting diode circuit 2 (or the feeding current flowing through the light emitting diode circuit 2), and the waveform C shows the power dissipated in the bleeder circuit 1 (or the bleeder current). According to this example, without the bleeder circuit 1, dimming below 20% is not possible. With the bleeder circuit 1, dimming down to 3% has become possible (difference between the waveforms A and B). Clearly, the bleeder circuit 1 enables so called deep dimming, which is a great advantage. The exact gain in deep dimming depends on a transfer function of the converter 3.

Figure 4:
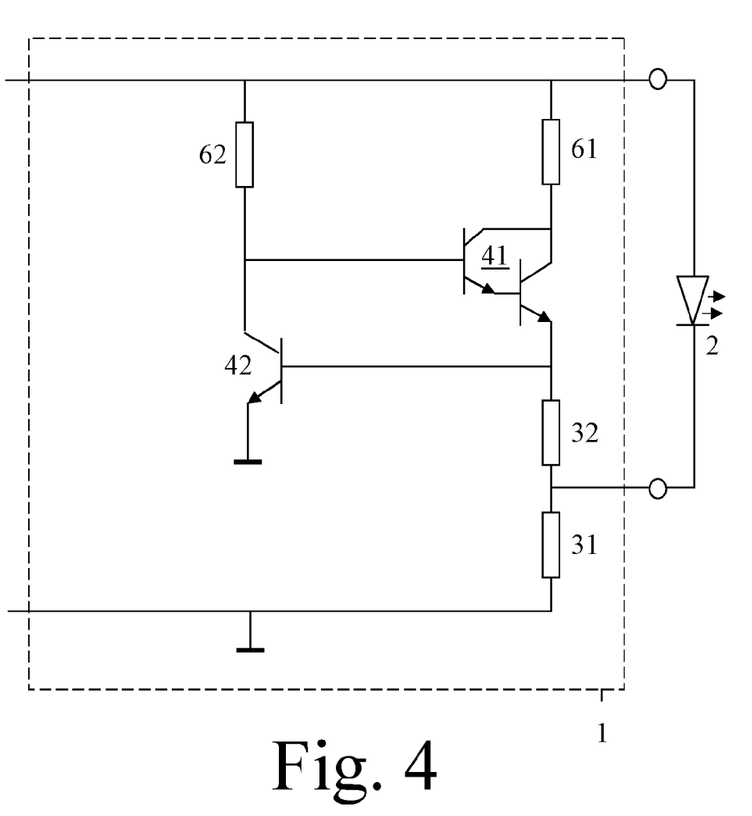
FIG. 4 shows a second embodiment of a bleeder circuit.

In the FIG. 4, a second embodiment of a bleeder circuit 1 is shown. A first input terminal of the bleeder circuit 1 is coupled to a first output terminal of the bleeder circuit 1. A second input terminal of the bleeder circuit 1 is coupled to a second output terminal of the bleeder circuit 1 via a first resistor circuit 31 here in the form of a single resistor, but an embodiment with more than one resistor is not to be excluded. The bleeder circuit 1 comprises a first transistor circuit 41, here in the form of two transistors in a Darlington configuration, but an embodiment with one or three or more transistors is not to be excluded. A first main electrode of the first transistor circuit 41 is coupled via a second resistor circuit 32 to the first resistor circuit 31 and to the second output terminal of the bleeder circuit 1. The second resistor circuit 32 comprises a single resistor, but an embodiment with more than one resistor is not to be excluded. A second main electrode of the first transistor circuit 41 is coupled via a resistor 61 to the first output terminal of the bleeder circuit 1. The resistor 61 reduces a power dissipation in the first transistor circuit 41 etc. A control electrode of the first transistor circuit 41 is coupled via a resistor 62 to the first output terminal of the bleeder circuit 1 and to a second main electrode of a second transistor circuit 42, here in the form of a single transistor, but an embodiment with two or more transistors is not to be excluded. A first main electrode of the second transistor circuit 42 is coupled to ground, with the second input terminal of the bleeder circuit 1 being coupled to ground too. A control electrode of the second transistor circuit 42 is coupled to the first main electrode of the first transistor circuit 41.

As soon as an amplitude of a current flowing through the light emitting diode circuit 2 coupled to the output terminals of the bleeder circuit 1 gets a too small value, an amplitude of a voltage across the resistor circuit 31 gets a too small value, and the second transistor circuit 42 controls the first transistor circuit 41 to introduce a bleeder current. As a result, even for relatively small output intensities of the light emitting diode circuit 2, the dimmer 4 will not get into trouble. Usually, the first resistor circuit 31 and the second resistor circuit 32 and the second transistor circuit 42 form part of the detection circuit 11, and the first transistor circuit 41 forms part of the introduction circuit 12.

Figure 5:
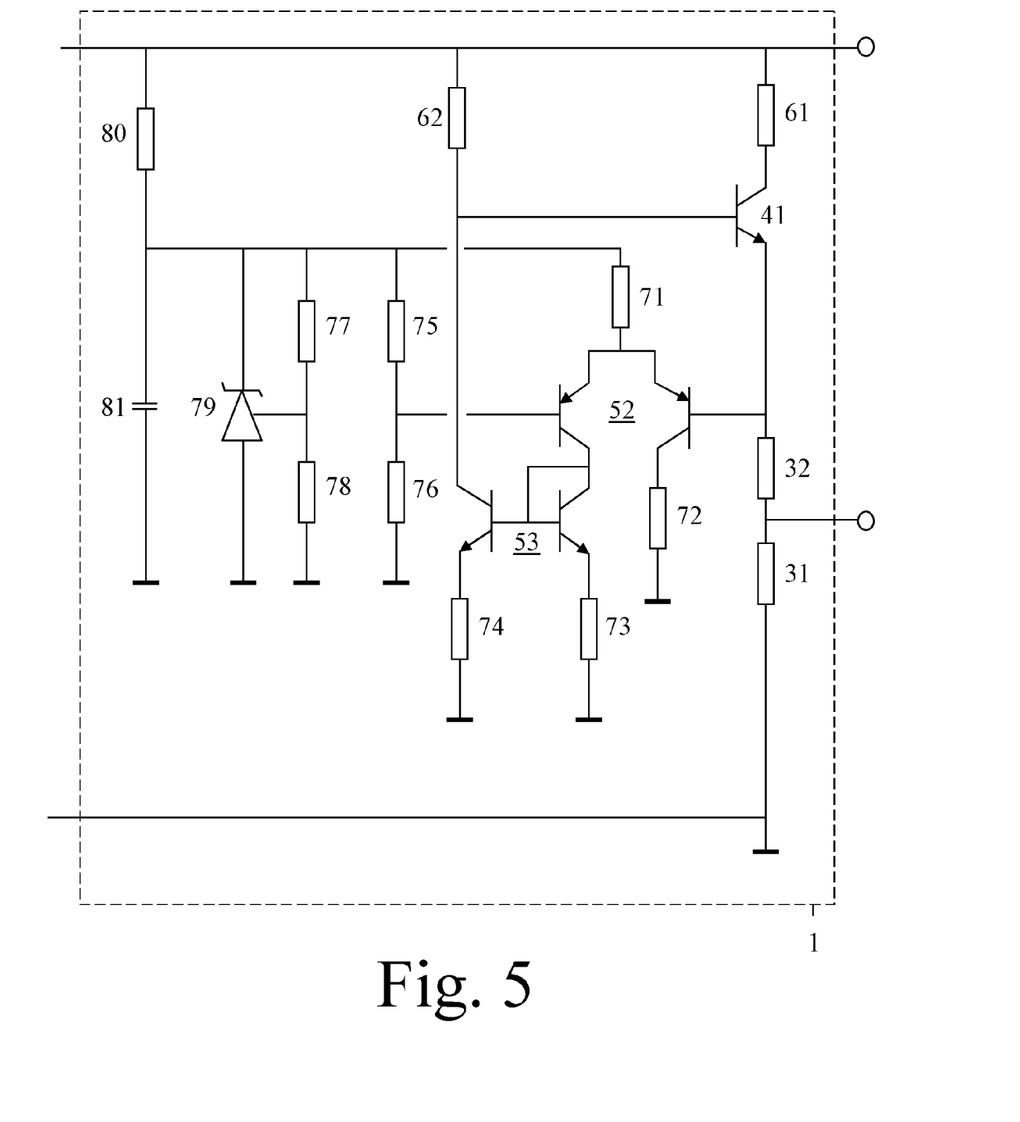
FIG. 5 shows a third embodiment of a bleeder circuit.

In the FIG. 5, a third embodiment of a bleeder circuit 1 is shown. A first input terminal of the bleeder circuit 1 is coupled to a first output terminal of the bleeder circuit 1. A second input terminal of the bleeder circuit 1 is coupled to a second output terminal of the bleeder circuit 1 via a first resistor circuit 31 here in the form of a single resistor etc. The bleeder circuit 1 comprises a first transistor circuit 41, here in the form of a single transistor etc. A first main electrode of the first transistor circuit 41 is coupled via a second resistor circuit 32 to the first resistor circuit 31 and to the second output terminal of the bleeder circuit 1. The second resistor circuit 32 comprises a single resistor etc. A second main electrode of the first transistor circuit 41 is coupled via a resistor 61 to the first output terminal of the bleeder circuit 1 etc. A control electrode of the first transistor circuit 41 is coupled via a resistor 62 to the first output terminal of the bleeder circuit 1 and is coupled to a first input of a current mirror configuration 53 comprising two transistors. A first output of the current mirror configuration 53 is coupled to ground via a resistor 74, with the second input terminal of the bleeder circuit 1 being coupled to ground too. A second input of the current mirror configuration 53 is coupled to a first output of a differential amplifier configuration 52 comprising two transistors. A second output of the current mirror configuration 53 is coupled to ground via a resistor 73.

A second output of the differential amplifier configuration 52 is coupled to ground via a resistor 72. A feeding input of the differential amplifier configuration 52 is coupled via a resistor 71 to an interconnection between a resistor 80 and a capacitor 81. The resistor 80 is further coupled to the first input terminal of the bleeder circuit 1, and the capacitor 81 is further coupled to ground. A first control input of the differential amplifier configuration 52 is coupled via a resistor 75 to the interconnection and via a resistor 76 to ground. The interconnection is further coupled via a voltage reference element 79 to ground, with a control electrode of the voltage reference element 79 being coupled via a resistor 77 to the interconnection and via a resistor 78 to ground. A second control input of the differential amplifier configuration 52 is coupled to the first main electrode of the first transistor circuit 41. Compared to the second embodiment of the bleeder circuit 1 shown in the FIG. 4, the third embodiment of the bleeder circuit 1 shown in the FIG. 5 will perform better because of the differential amplifier configuration 52 and the current mirror configuration 53. Usually, the differential amplifier configuration 52 and the current mirror configuration 53 will form part of the detection circuit 11 etc.

Figure 6:
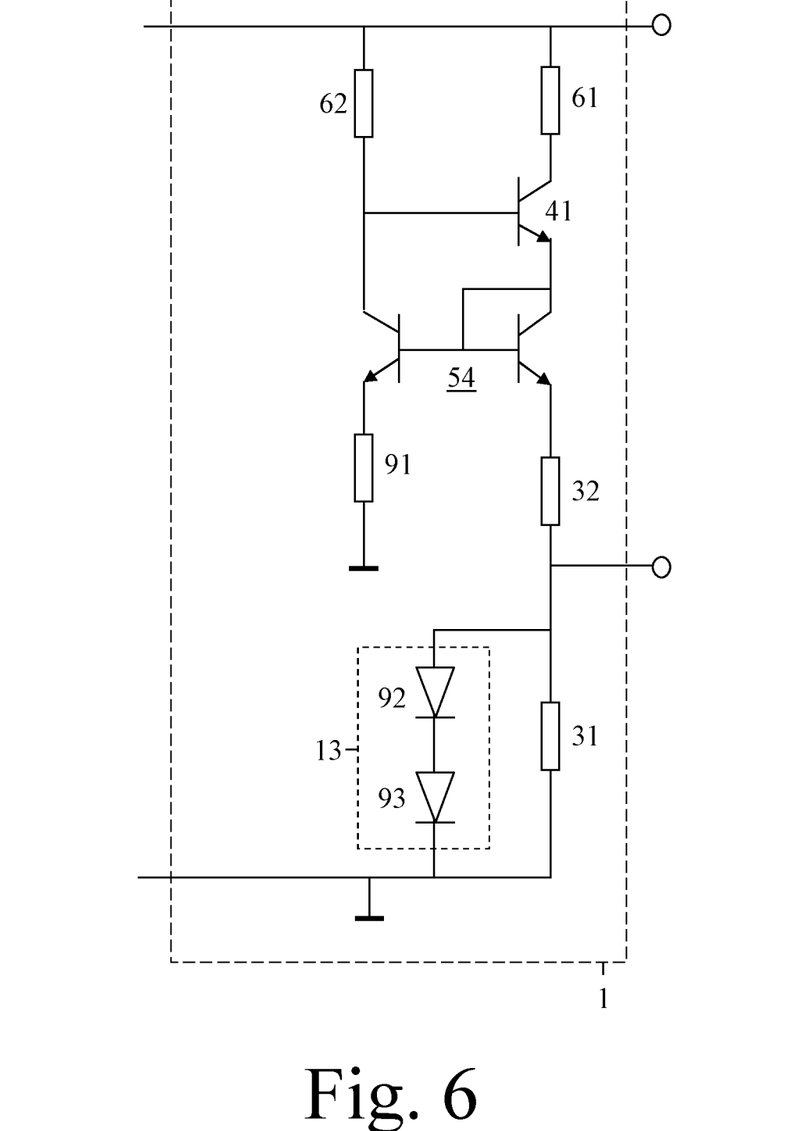
FIG. 6 shows a fourth embodiment of a bleeder circuit.

In the FIG. 6, a fourth embodiment of a bleeder circuit 1 is shown. A first input terminal of the bleeder circuit 1 is coupled to a first output terminal of the bleeder circuit 1. A second input terminal of the bleeder circuit 1 is coupled to a second output terminal of the bleeder circuit 1 via a first resistor circuit 31 here in the form of a single resistor etc. The bleeder circuit 1 comprises a first transistor circuit 41, here in the form of a single transistor etc. A first main electrode of the first transistor circuit 41 is coupled via a second transistor circuit 54 and via a second resistor circuit 32 to the first resistor circuit 31 and to the second output terminal of the bleeder circuit 1. The second resistor circuit 32 comprises a single resistor etc. and is coupled to the first main electrode of the first transistor circuit 41 via electrodes of the second transistor circuit 54. The second transistor circuit 54 here comprises two transistors in a current mirror configuration. A second main electrode of the first transistor circuit 41 is coupled via a resistor 61 to the first output terminal of the bleeder circuit 1 etc. A control electrode of the first transistor circuit 41 is coupled via a resistor 62 to the first output terminal of the bleeder circuit 1 and to a first input of the current mirror configuration 54. A first output of the current mirror configuration 54 is coupled via a resistor 91 to ground. A second input and a second output of the current mirror configuration 54 form said electrodes. Usually, the current mirror configuration 54 will form part of the detection circuit 11 etc. This current mirror configuration 54 offers good thermal stability.

Preferably, as shown in the fourth embodiment of the bleeder circuit 1, the bleeder circuit 1 may further comprise a bypassing circuit 13 for bypassing at least a part of the detection circuit 11 during an inactivity of the bleeder circuit 1, to reduce a power consumption. The bypassing circuit 13 may for example comprise a diode circuit 92, 93 coupled in parallel to the first resistor circuit 31 of the detection circuit 11. Such a diode circuit 92, 93 may comprise one diode or two or more for example serially coupled diodes.

Two elements may be coupled indirectly via a third element or may be coupled directly without a third element being in between. Of the embodiments shown, a part of one of them may be added to another one of them, and a part of one of them may replace another part in another one of them.

Summarizing, bleeder circuits 1 comprise detection circuits 11 for detecting values of amplitudes of feeding currents for feeding light emitting diode circuits 2 and comprise introduction circuits 12 for introducing bleeder currents. Values of amplitudes of bleeder currents are defined in response to detection results from the detection circuits 11. As a result, disadvantageous connections between the bleeder circuits 1 and dimmers 4 are avoided, and the bleeder circuits 1 can be located near the light emitting diode circuits 2 and they can use the same heat sink. The detection circuit 11 may comprise a first resistor circuit 31, and the introduction circuit 12 may comprise a first transistor circuit 41. The detection circuit 11 may further comprise a second resistor circuit 32 for coupling the first transistor circuit 41 to the first resistor circuit 31 and may comprise an operational amplifier 51 or a second transistor circuit 42 for controlling the first transistor circuit 41.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device comprising:
a light emitting diode circuit;
a bleeder circuit for improving a dimming operation of the light emitting diode circuit, the bleeder circuit comprising:
a detection circuit for detecting a value of an amplitude of a current, the detection circuit including a first resistor circuit, a second resistor circuit for coupling a first transistor circuit to the first resistor circuit, the second resistor circuit being coupled to a first main electrode of the first transistor circuit, and a second transistor circuit for controlling the first transistor circuit, the second transistor circuit comprising two transistors in a differential amplifier configuration and two transistors in a current mirror configuration an introduction circuit for introducing a bleeder current, a value of an amplitude of the bleeder current being defined in response to a detection result from the detection circuit, wherein and the introduction circuit comprising a first transistor circuit, and
a converter for providing a feeding current,
wherein the detection circuit is configured to detect the feeding current provided by the converter and which feeding current is configured to flow through at least a part of the light emitting diode circuit,
wherein the bleeder circuit and the light emitting diode circuit are thermally coupled.

2. The device as claimed in claim 1, characterized in that a relatively large value of the amplitude of the feeding current resulting in a relatively small value of the amplitude of the bleeder current, and a relatively small value of the amplitude of the feeding current resulting in a relatively large value of the amplitude of the bleeder current.

3. The device as claimed in claim 1, the first transistor circuit comprising a single transistor or comprising two transistors in a Darlington configuration.

4. The device as claimed in claim 1, the detection circuit further comprising an operational amplifier for controlling the first transistor circuit.

5. The device as claimed in claim 1, the second transistor circuit comprising a single transistor.

6. The device as claimed in claim 1, the detection circuit further comprising a second transistor circuit for controlling the first transistor circuit, the second resistor circuit being coupled to a first main electrode of the first transistor circuit via electrodes of the second transistor circuit.

7. The device as claimed in claim 6, the second transistor circuit comprising two transistors in a current mirror configuration.

8. A device comprising:
a light emitting diode circuit;

a bleeder circuit for improving a dimming operation of the light emitting diode circuit, the bleeder circuit comprising:

a detection circuit for detecting a value of an amplitude of a current, the detection circuit including a transistor circuit comprising two transistors in a differential amplitude configuration and two transistors in a current mirror configuration;

an introduction circuit for introducing a bleeder current, a value of an amplitude of the bleeder current being defined in response to a detection result from the detection circuit, and a converter for providing a feeding current, wherein the detection circuit is configured to detect the feeding current provided by the converter and which feeding current is configured to flow through at least a part of the light emitting diode circuit, wherein the bleeder circuit and the light emitting diode circuit are thermally coupled, and a bypassing circuit for bypassing at least a part of the detection circuit during an inactivity of the bleeder circuit.

9. The device as claimed in claim 8, the bypassing circuit comprising a diode circuit coupled in parallel to a first resistor circuit of the detection circuit.

10. The device as defined in claim 1, further comprising a converter for providing the bleeder current and the feeding current, the converter on the one hand and the bleeder circuit and the light emitting diode circuit on the other hand being thermally decoupled.

11. The bleeder circuit for use in the device as claimed in claim 1.

* * * * *